Dec. 28, 1965 J. C. DAVIDSON 3,226,648
CLOCK SYSTEM FOR ELECTRONIC COMPUTERS
Filed Jan. 29, 1962
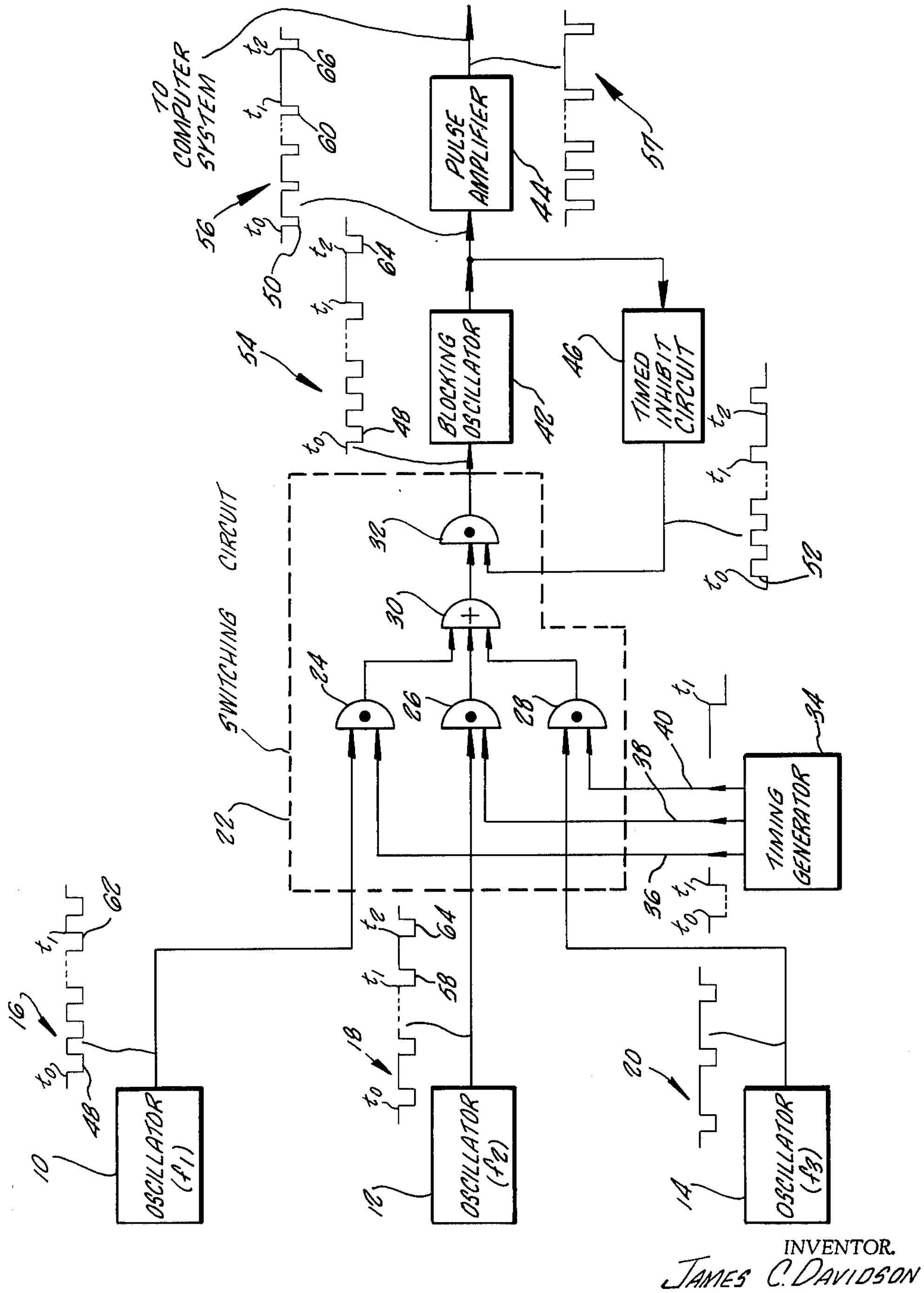
INVENTOR.
JAMES C. DAVIDSON
BY
Christie, Parker & Hale
ATTORNEYS.

United States Patent Office 3,226,648

Patented Dec. 28, 1965

3,226,648

CLOCK SYSTEM FOR ELECTRONIC COMPUTERS

James C. Davidson, Glendora, Calif., assignor to Burroughs Corporation, Detroit, Mich., a corporation of Michigan Filed Jan. 29, 1962, Ser. No. 169,335
2 Claims. (Cl. 328—63)

This invention relates to a novel system for developing electrical pulse signals which is particularly adapted to use as a clock system for electronic computers having peripheral units which operate at different rates.

In electronic computer systems, the rate of operation of the main processing and storage unit of the computer as well as the peripheral units associated therewith is accurately controlled by timing pulses. The timing pulses are commonly termed "clock pulses" and the frequency of such clock pulses termed the "clock rate." In general, the peripheral units of the computer system, such as card readers, tape units, etc., as well as the main computer unit, each operate at different clock rates. To store and process information from the peripheral units into the main computer unit it has thus been the practice in the past to utilize a separate buffer register between each peripheral unit and the main computer. The buffer registers function to receive and store information from the associated peripheral units at the clock rate of the respective peripheral units. The information thus stored in the buffer registers is then available for transmission to the main computer unit at the clock rate of the main computer.

The use of buffer registers, however, materially increases the complexity as well as the overall cost of the computer system.

In contrast to the above, the clock system of the present invention provides means for directly transferring information from the peripheral units to the main computer unit for storage and processing without the use of separate buffer registers.

To accomplish this the present invention, in a basic form, includes a plurality of signal oscillators which may be located at the main computer unit. Each oscillator develops an electrical signal having a frequency corresponding to the clock rate of a different peripheral unit. The oscillators are thus operating asychronously. The output of each oscillator is coupled to a switching circuit for selectively coupling one of the oscillators to a pulse former, such as a blocking oscillator. The pulse former develops a clock pulse in response to each electrical signal applied thereto.

The clock pulses developed by the pulse former are then utilized as the clock pulses for the computer system to control the rate of transfer, processing and storing of information from a peripheral unit to the main computer unit. Thus, for example, if it is desired to transfer information stored in the tape unit into the main computer unit, the oscillator developing electrical signals at the clock rate of the tape unit is selectively coupled through the switching circuit to the pulse former. The electrical signals applied to the pulse former develop clock pulses for the main computer having a clock rate corresponding to that of the tape unit. Accordingly, information may then be transferred at the clock rate of the tape unit directly into the main computer unit.

In a similar manner, if it is desired to transfer information from the card reader into the main computer, the oscillator associated with the card reader is selectively coupled through the switching circuit to the pulse former.

Thus, by operation of the clock system of the present invention, the clock rate of the main computer is selectively changed to provide means for directly transferring information from the peripheral units into the main computer unit.

As is commonly known, the digital circuits of a computer system require a predetermined period of time to recover after performing a logical operation in response to a clock pulse before being ready to receive another clock pulse. Thus, a minimum time is required between the clock pulses generated by a clock system. In the above described system, however, due to the switching between the asychronously operating oscillators and the pulse former, consecutive clock pulses may be generated which are separated in time by less than the aforementioned minimum time. If this occurs logical errors may be produced in the computer system.

To insure a minimum lapse of time between clock pulses generated by the pulse former, irrespective of switching between the oscillators and the pulse former, the switching circuit preferably includes an AND gate for normally coupling the selected oscillator to the pulse former. Coupled between the pulse former and the AND gate is an inhibit circuit. The inhibit circuit functions to inhibit the passing of electrical signals through the AND gate for a predetermined period of time in response to a clock pulse developed by the pulse former. The predetermined period of time for which the inhibit circuit inhibits the AND gate may be termed the "delay time" of the inhibit circuit. The delay time is preferably adjusted to be equal to or greater than the minimum time required for the recovery of the digital circuits. In this manner, irrespective of the switching of the oscillator to the pulse former, the minimum lapse of time is maintained between the clock pulses, thereby insuring the recovery of the digital circuits included in the computer.

The above, as well as other features of the present invention, may be more clearly understood by reference to the following detailed description when considered with the drawing, the single figure of which is a schematic-block diagram representation of a preferred form of the present invention.

As represented, the clock system of the present invention includes a plurality of signal oscillators, three of which are represented at 10, 12, and 14. The oscillators are constructed to develop negative pulse signals, each having a different frequency. Thus, for example, the oscillator 10 develops negative pulse signals at a high frequency $f_1$ and having a waveform such as illustrated at 16. The oscillator 12 develops pulse signals at a moderate frequency $f_2$ and having a waveform illustrated at 18, while the oscillator 14 develops pulse signals at a low frequency $f_3$ and having a waveform illustrated at 20. The oscillators 10, 12, and 14 operate asynchronously and continuously apply pulse signals to a switching circuit 22.

By way of example only, the switching circuit 22 includes AND gates 24, 26, and 28, an OR gate 30 and an AND gate 32. The gates in the switching circuit 22 are each constructed to develop a negative electrical signal at its output terminal in response to negative electrical signals applied to its input terminal. Thus, the AND gates 24, 26, 28, and 32 pass a negative pulse signal in response to negative pulse signals simultaneously applied to their respective input terminals while the OR gate 30 passes a negative pulse signal in response to a negative pulse signal applied to any one of its input terminals.

As illustrated, the oscillators 10, 12, and 14 are coupled to one input terminal of the AND gates 24, 26, and 28, respectively. The remaining input terminals of the AND gates 24, 26, and 28 are coupled to a timing generator 34. The timing generator 34, which may include a plurality of flip-flops, may be under the control of the main computer unit of the system. The timing generator 34 functions to develop a negative electrical signal on a selected one of its output leads 36, 38, and 40. The output leads 36, 38, and 40 are coupled to the remaining input terminal of AND gates 24, 26, and 28, respectively. In response to a negative electrical signal on one of the output leads negative pulse signals are passed through the associated AND gate from the oscillator coupled thereto. In this manner the timing generator selectively controls the gating of AND gates 24, 26, and 28 to couple pulse signals from one of the oscillators 10, 12, and 14 to the OR gate 30.

As illustrated, the output terminal of each of the AND gates 24, 26, and 28 is coupled to a different input terminal of the OR gate 30. The output terminal of the OR gate 30 is, in turn, coupled to one of the input terminals of the AND gate 32. Since the OR gate 30 is constructed to pass negative signals appearing at any one of its input terminals the pulse signals gated through one of the AND gates 24, 26, and 28 passes through the OR gate 30 to the AND gate 32.

The output terminal of the AND gate 32 is coupled to a blocking oscillator 42. The blocking oscillator 42 develops a negative clock pulse of a predetermined time duration in response to each negative pulse signal applied thereto.

The blocking oscillator 42 is coupled to a pulse amplifier 44 which amplifies the clock pulses developed by the blocking oscillator 42 and transmits the clock pulses to the computer system to control the rate at which information is stored and processed in the main computer unit.

Coupled between the output of the blocking oscillator 42 and the remaining input terminal of the AND gate 32 is a timed inhibit circuit 46. The timed inhibit circuit 46 may be of the type described in the copending patent application, Serial No. 136,052, filed September 5, 1961, now Patent No. 3,123,719, and assigned to the same assignee as the present invention. The inhibit circuit 46 normally produces a negative output signal at the remaining input terminal of the AND gate 32. This places the AND gate 32 in a state to pass negative pulse signals from the OR gate 30 to the blocking oscillator 42. In response to a clock pulse developed by the blocking oscillator 42, however, the output of the inhibit circuit 46 goes positive for a predetermined period of time. Since the AND gate 32 only passes negative pulse signals when both of its input terminals are negative, the positive output of the inhibit circuit 46 functions to inhibit the passing of negative pulse signals through the AND gate 32 for the predetermined period of time. In this manner a minimum lapse of time equal to the predetermined period of time is maintained between successive clock pulses developed by the blocking oscillator 42. The predetermined period of time for which the inhibit circuit 42 develops a positive output signal may be termed the "delay time" of the inhibit circuit. As will be described in detail hereinafter, the delay time of the inhibit circuit 46 may be adjusted to insure a recovery of the digital circuits of the computer system between each clock pulse.

Considering the overall operation of the clock system of the present invention, each of the oscillators 10, 12, and 14 may be associated with a particular peripheral unit of the computer system. Thus, for example, the oscillator 10 may be developing negative pulse signals at a frequency corresponding to a clock rate of a card reader while the oscillator 12 is producing pulse signals at a frequency corresponding to the clock rate of a tape unit.

For analysis, assume that at a time $t_0$ it is desired to transfer information from the card reader into the main computer unit of the computer system. At the time $t_0$ the timing generator 34 is energized to develop a negative electrical signal on the output lead 36. The negative pulse signals generated by the oscillator 10 are thus gated through the AND gate 24, the OR gate 30 to the AND gate 32. At time $t_0$ the inhibit circuit 46 is developing a negative output signal, thus, the first pulse 48 generated by the oscillator 10 passes through the AND gate 32 to the blocking oscillator 42.

In response to the negative pulse signal 48 the blocking oscillator 42 develops a negative clock pulse 50 which is amplified by the pulse amplifier 44 and transmitted to the computer system.

In response to the clock pulse 50 the output signal developed by the inhibit circuit 46 becomes positive as illustrated at 52. The output of the inhibit circuit 46 remains positive for the delay time of the inhibit circuit which, by way of example, is greater than the minimum time required for the digital circuits of the computer to recover and is set to substantially equal the time interval between the pulse signals generated by the oscillator 10. Accordingly, the output of the inhibit circuit returns to its normal state prior to the arrival of each pulse from the oscillator 10 at the AND gate 32. Each pulse signal from the oscillator 10 is thus gated through the AND gate 32 to the blocking oscillator 42 as illustrated by the waveform 54. The blocking oscillator 42 in turn develops a train of clock pulses illustrated at 56 having a clock rate corresponding to the frequency $f_1$ of the pulses generated by the oscillator 10.

As illustrated by the waveform 57, each clock pulse in the train 56 is amplified by the amplifier 44 and transmitted to the computer system to control the rate of transfer of information from the card reader to the main computer unit.

Some time later at a time $t_1$, for example, it is desired to transfer information from the tape unit to the main computer unit. At time $t_1$ the output lead 38 of the timing generator 34 is energized while the signal on the output lead 36 returns to its normally positive state. The AND gate 26 is thus set to pass negative pulse signals from the oscillator 12 to the OR gate 30 at the frequency $f_2$ of the oscillator 12.

At time $t_1$ the oscillator is developing a negative pulse signal 58. As illustrated by the waveforms 16 and 56, however, at the time $t_1$ the blocking oscillator 42 has just completed developing a clock pulse 60 in response to the negative pulse 62 generated by the oscillator 10. Thus, if the pulse signal 58 were allowed to develop a clock pulse, consecutive clock pulses would be spaced in time by less than that required for the digital circuits in the computer system to recover. In such a case logical switching errors would occur in the computer and information would be improperly stored and processed.

In the clock system of the present invention, however, at the time $t_1$ the output of the inhibit circuit is positive in response to the clock pulse 60 developed by the blocking oscillator 42. The negative pulse 58 is thus inhibited from passing through the AND gate 32 to the blocking oscillator 42. In this manner the inhibit circuit 46, by having a time delay equal to or greater than the minimum recovery time of the digital circuits of the computer system, insures that the minimum time is maintained between the clock pulses developed by the clock system and thereby prevents logical errors from occurring in switching between the plurality of oscillators.

In particular, the time delay of the inhibit circuit is set to substantially equal the time interval between the pulse signals generated by the oscillator 10. Since the frequency of the oscillator 10 is higher than that of the oscillators 12 and 14, the output of the inhibit circuit 46 returns to its normal negative state prior to the generation of the next negative pulse signal 64 by the oscillator 12 at a time $t_2$. The pulse 64 is therefore gated through the AND gates 26, the OR gate 30 and the AND gate 32 to the blocking oscillator 42.

In response to the pulse 64 the blocking oscillator 42 develops a clock pulse 66 which is amplified and transmitted to the computer system.

In response to the clock pulse 64, the output signal developed by the inhibit circuit 46 goes positive to inhibit the passing of signals through the AND gate 32 for the delay time of the inhibit circuit. Since the delay time of the inhibit circuit is less than the time interval between the pulse signals generated by the oscillator 12, each subsequent pulse signal generated by the oscillator 12 passes through the AND gate 32 to develop a clock pulse. A train of clock pulses is thus developed by the blocking oscillator 42 at a clock rate equal to the frequency $f_2$ of the oscillator 12. In response to the clock pulses information may then be directly transferred from the tape unit to the main computer unit at the clock rate of the tape unit.

Accordingly, by the overall operation of the clock system of the present invention, the clock rate of the computer system is selectively changed to provide means for directly transferring information from each peripheral unit of the system into the main computer unit at the clock rate of the respective peripheral units while the combination of the inhibit circuit insures a minimum recovery time between each clock pulse in the switching of clock rates.

What is claimed is:

1. A clock system comprising:

a plurality of signal oscillators for developing a plurality of periodic electrical signals each signal having a different frequency;

a pulse former having an input terminal and an output terminal for developing clock pulses at the output terminal in response to periodic electrical signals applied to the input terminal;

switching means for selectively coupling electrical signals from any selected one of the oscillators to the input terminal of the pulse former and including an AND gate coupled between the selected oscillator and the input terminal of the pulse former for normally gating electrical signals from the selected oscillator to the pulse former;

and an inhibit circuit having its input coupled to the output terminal of the pulse former and having its output coupled to the input to the AND gate for inhibiting the gating of electrical signals to the pulse former for a predetermined period of time in response to a clock pulse formed at the output terminal of the pulse former.

2. A clock system comprising:

a plurality of continuously cycling oscillators for generating pulse signals of different repetition frequencies;

a pulse forming circuit for generating a pulse in response to an input signal pulse;

means for gating an output signal from any selected one of said oscillators to the pulse forming circuit including means for switching from one oscillator output signal to another at any random time in relation to the pulse signals generated by the oscillators in response to applied selection signals;

and means responsive to the output pulses from the pulse forming circuit for inhibiting operation of the pulse forming circuit following the generation of each output therefrom during a time interval only slightly less than the shortest period between output pulses of any of said oscillators.

References Cited by the Examiner

UNITED STATES PATENTS 3,029,389 4/1962 Morphet ---------- 328—154 X

ARTHUR GAUSS, *Primary Examiner.*